April 16, 1963    J. L. PECZKOWSKI ET AL    3,085,556
RATE SIGNAL GENERATOR
Filed March 17, 1961    3 Sheets-Sheet 1
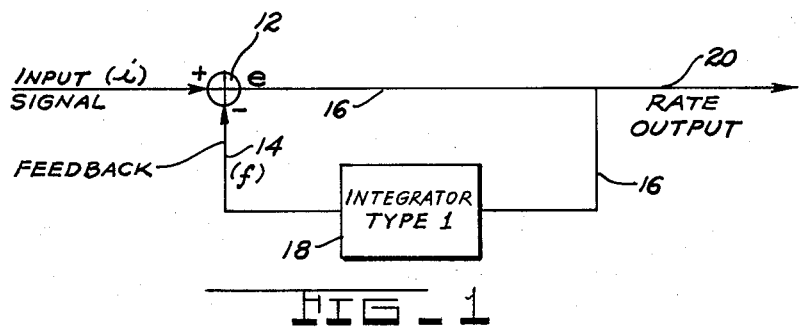
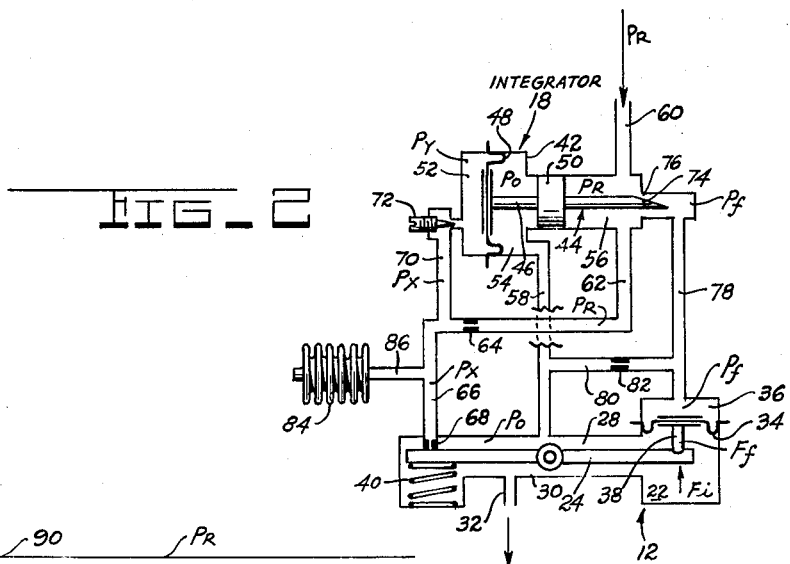
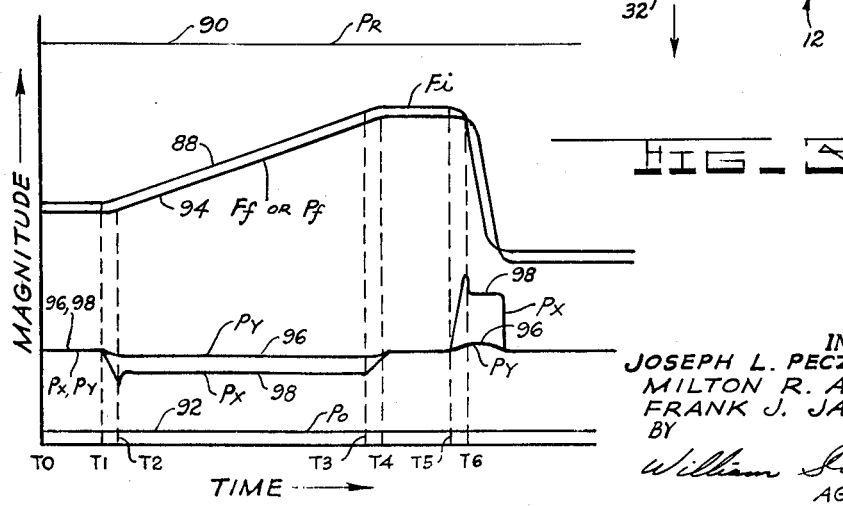
INVENTORS
JOSEPH L. PECZKOWSKI.
MILTON R. ADAMS.
FRANK J. JANDRASI.
BY
William S. Thompson
AGENT

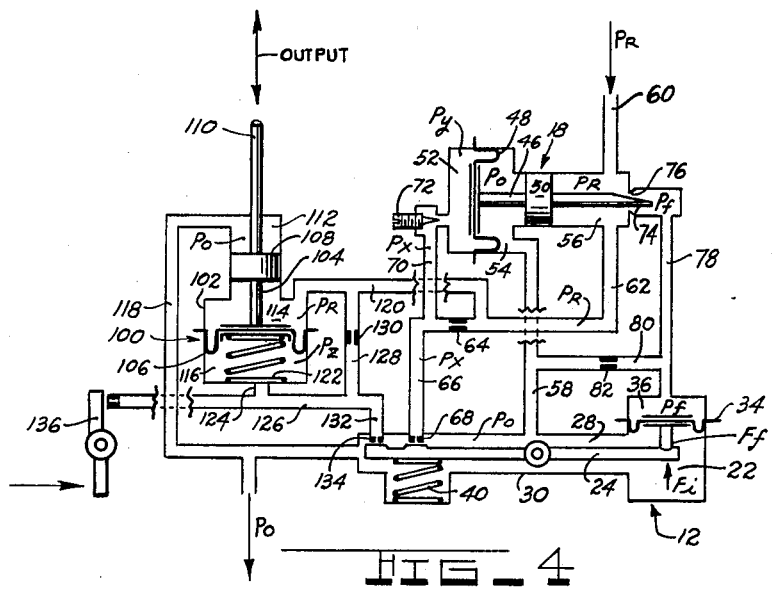
FIG_4
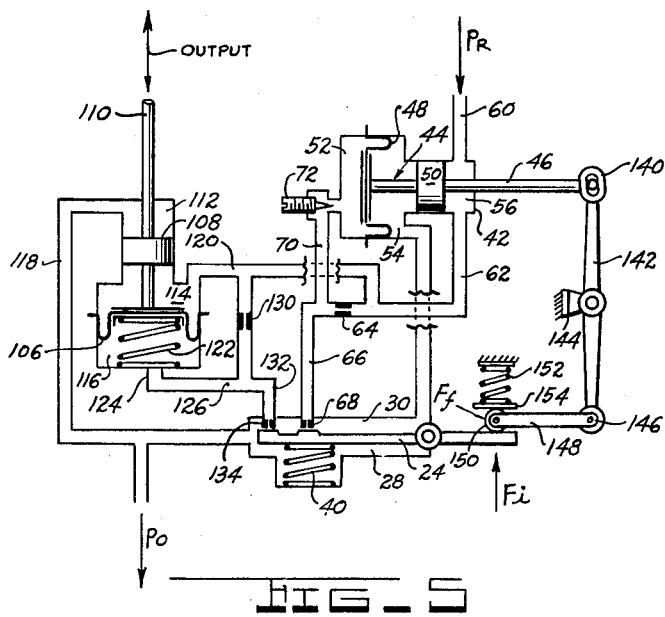
FIG_5

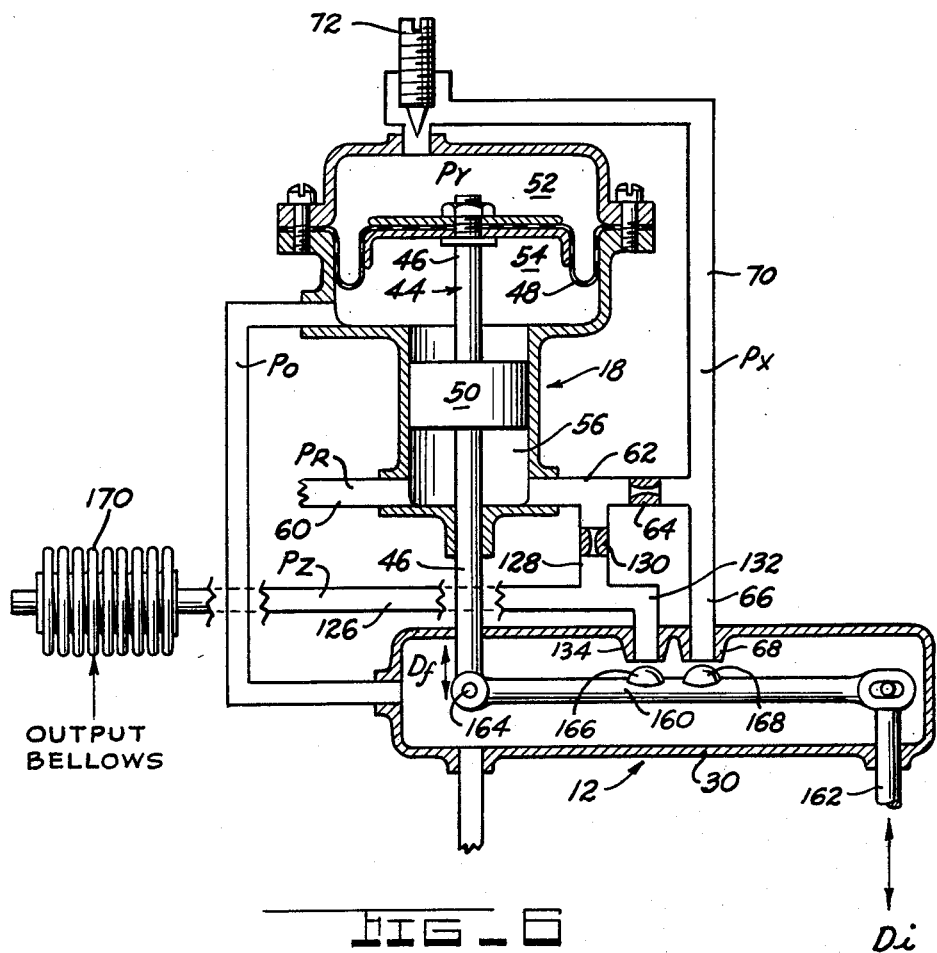
FIG_6
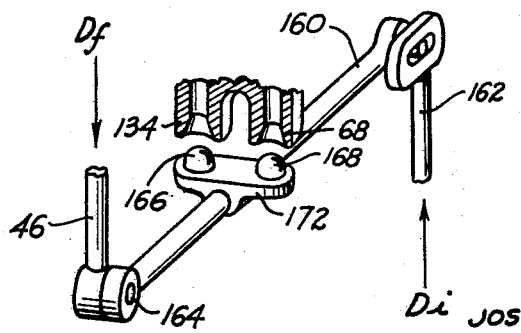
FIG_7
INVENTORS
JOSEPH L. PECZKOWSKI.
MILTON R. ADAMS.
FRANK J. JANDRASI.
BY
William S Thompson
AGENT.

United States Patent Office 3,085,556
Patented Apr. 16, 1963

3,085,556
RATE SIGNAL GENERATOR
Joseph L. Peczkowski, Milton R. Adams, and Frank J. Jandrasi, South Bend, Ind., assignors to The Bendix Corporation, South Bend, Ind., a corporation of Delaware
Filed Mar. 17, 1961, Ser. No. 96,559
14 Claims. (Cl. 121—38)

The present invention relates to a rate signal generator and more particularly a hydromechanical rate signal generator operative to produce an output signal representative of the rate of change of a force or position input quantity.

It is often desired in hydromechanical computers to utilize a rate signal as a control or stabilizing signal. For example, in copending application 499,432, filed April 5, 1955 in the names of H. J. Williams, F. R. Rogers and B. J. Ryder and commonly assigned, there is described a governor device utilizing a rate signal for stabilization to prevent overshooting or hunting of the engine speed in response to governor control. Such prior art devices, however, have the disadvantage of producing a rate signal on the output side of a servomotor and therefore are subject to time lags which interfere with rapid and efficient stabilization.

It is an object of the present invention to provide a rate signal generator of the hydromechanical type having improved time response between an input quantity change and output signal response.

It is another object of the present invention to provide an improved hydromechanical rate signal generator of simple and reliable construction and subject to a minimum of frictional and time lag impediments.

It is another object of the present invention to provide a rate signal generator comprised of a servo mechanism loop including an integrator wherein the rate signal is taken from the input side of the integrator and thus not retarded by the time lag constant of the integrator or other movable servo device.

It is a still further object of the present invention to provide a rate signal generator for producing an output signal in terms of either force, pressure, or position change representative of the rate of change of a force or position input signal, and which output signal may be readily combined with other output signals.

Other objects and advantages of the present invention will become apparent on consideration of the description and accompanying drawings wherein:

FIGURE 1 is a block diagram of a servo mechanism arranged in accordance with the present invention to provide a rate output signal;

FIGURE 2 is a schematic drawing of a hydromechanical servo apparatus comprising one preferred embodiment of the present invention having particular utility in providing a low displacement rate output signal;

FIGURE 3 is a graph showing some of the operating characteristics of the FIGURE 2 embodiment;

FIGURE 4 is a schematic of a second embodiment of a hydromechanical servo mechanism for providing either a high or low displacement rate output signal;

FIGURE 5 is a schematic of the rate generator of FIGURE 4 modified to have mechanical rather than a hydraulic feedback connection; and FIGURES 6 and 7 are schematic drawings of another embodiment of the present invention for directly utilizing a position input signal.

There is shown in FIGURE 1 a block diagram of a servo mechanism for producing a rate output signal in response to the rate of change of an input quantity in accordance with the present invention. An input quantity, $i$, is applied to a comparer means 12 to be compared with a feedback quantity, $f$, applied to the comparer by feedback connection 14. The difference or error, $e$, between input quantity, $i$, and feedback quantity, $f$, is supplied from comparer 12 through connection 16 to an integrating or type 1 servo device 18 as an input thereto. Integrator 18 has the characteristic of changing its output signal, $f$, at a rate or velocity proportional to its error input, $e$, such that the absolute change in the feedback quantity $f$ is the integral taken with respect to time of $e$. Thus when $i$ is maintained at a stable value, integrator 18 will continue to change the feedback quantity $f$ until the error signal $e$ is zero. In a servo mechanism thus far described it is found that the error signal, $e$, is proportional to the derivative with respect to time of the input force $i$ or is a measure of the rate of change of $i$. Advantage is taken of this servo loop characteristic by taking a rate signal output, connection 20, from the error signal connection 16. Further by taking the rate output from the input side of integrator 18, rapid response to changes of $i$ are achieved since the output signal is not retarded by the time lag constant of integrator 18.

Referring now to FIGURE 2, a hydromechanical rate signal generator functioning in the manner of the servo mechanism of FIGURE 1 is shown. Comparer 12 includes a housing 30 defining a chamber 28 in which is disposed a pivoted balance beam 24. The input quantity for this arrangement is a force $F_i$ and is applied at 22 on the right end of beam 24. Chamber 28 contains low pressure control fluid $P_0$ of substantially constant value connected to a servo fluid dump reservoir, not shown, by conduit 32. Diaphragm 34 is peripherally secured to the interior of housing 30 and forms a smaller chamber 36 on its upper side. A plate and rod projection 38 are centrally secured to diaphragm 34 and bears against the right end of beam 24 to apply a feedback quantity as a force $F_f$ to said beam in opposition to $F_i$. A balance or stabilizing spring 40 is contained in chamber 28 and bears against the left end of beam 24 to provide a restoring force proportional to the angular position of said beam.

Integrator 18 includes a stepped diameter housing member 42 and a movable integrator member 44 disposed in said housing and arranged to move axially therein in response to fluid pressure forces. Integrator member 44 is comprised of a first large diameter pressure responsive member or diaphragm 48, a second smaller diameter pressure responsive member or piston 50, and a central connecting rod 46 secured to both of said pressure responsive members. Pressure responsive members 48 and 50 engage the inside diameters of housing 42 in substantially a fluid tight manner and define first, second, and third fluid receiving compartments 52, 54 and 56 respectively within housing 42. $P_0$ pressure fluid from chamber 28 of comparer 12 is transmitted to second compartment 54 by connecting conduit 58. A relatively high pressure control fluid designated $P_R$, is supplied to third compartment 56 by conduit 60 from a high constant pressure fluid source, not shown. A conduit 62 is connected on one end to compartment 56 for receiving $P_R$ fluid. A restrictive bleed or orifice member 64 is contained in conduit 62 for causing a pressure drop or loss proportional to flow velocity. The pressure downstream of orifice 64 is designated $P_X$ and is equal to $P_R$ minus the pressure drop across orifice 64. Conduit 62 terminates at branch conduit 66 which extends into the interior of housing 30 of comparer 12 where it terminates with a fixed servo orifice 68 arranged in close proximity to balance beam 24. The position of balance beam 24 with respect to orifice 68 controls the fluid flow out of conduit 66 to $P_0$ containing chamber 28, and thus also the flow through and pressure drop across restriction 64, such that the value of $P_X$ is directly controlled by movement of beam 24 with respect to fixed orifice 68. A second branch conduit 70 interconnects conduit 62 downstream of orifice 64 with first compartment 52 of integrator 18. An externally adjustable velocity control valve or restriction 72 is arranged in conduit 70. Fluid pressure downstream of restriction 72 in compartment 52 is designated $P_y$.

Connecting rod 46 of integrator member 44 extends to the right beyond piston 50 and includes a slab valve member 74 contoured on its extreme right end. An orifice 76 is constructed in the end wall of housing 42 and is operative with valve 74 to define a variable effective area opening which is supplied $P_R$ fluid from chamber 56. Fluid pressure downstream of orifice 76 and valve 74 is designated $P_f$ and is supplied by conduit 78 to chamber 36 of comparer 12 where it acts on diaphragm 34 to generate force $F_f$ on beam 24. A conduit connection 80 including a restriction 82 is provided to interconnect $P_f$ containing conduit 78 and $P_0$ containing conduit 58 and thus provide a continuous flow circuit through orifice 76 such that $P_f$ is proportional (inversely) to the effective area defined by valve 74 and orifice 76.

A low displacement output signal receiving bellows 84 is connected to $P_X$ containing conduit 66 by conduit 86. Bellows 84 is adapted to actuate any signal receiving means such control, computer, or indicating means or the like, although for the present embodiment it is preferable that said signal receiving means be of a type requiring low displacement such as a servo control device or the like.

Referring to FIGURE 3 there is shown a graph containing several curves which show some of the operating characteristics of the present invention and relationships of various system pressures and forces to one another. The ordinate of the graph is representative of magnitude of the various force or pressure quantities whereas the abscissa is representative of time. Curve 88 represents an assumed variation of input force $F_i$. Curves 90 and 92 are illustrative of the substantially constant values of $P_R$ and $P_0$ pressures respectively which operate as the control fluid supply and dump reservoir for operating the hydromechanical servo device of the present invention. It should be understood that the constant pressure nature of $P_R$ and $P_0$ fluids is merely the preferred nature of these pressures which takes advantage of the highly developed state of hydraulic constant pressure regulating devices in the art. It is contemplated that other relationships may exist with but minor variations in the present invention such as for example utilizing a variable high pressure source while maintaining the difference between $P_R$ and $P_0$ at a constant value. Curves 94, 96 and 98 represent the variations of $F_f$ or $P_f$, $P_y$ and $P_X$ quantities respectively as they respond to the variations in $F_i$ as shown by curve 88.

*Operation*

Operation of the FIGURE 2 device may be best described with reference to the operating curves of FIGURE 3. The input force $F_i$ is maintained at a stable value as represented by the horizontal portion of curve 88 between times $T_0$ and $T_1$. Under this assumed condition the forces acting on beam 24 are in balance such that said beam assumes a stable position permitting a specific rate of fluid to discharge from orifice 68 of conduit 66. This action fixes $P_X$ at a relatively stable value which is less than $P_R$ due to the flow through restriction 64 and is represented by the portion of curve 98 between $T_0$ and $T_1$. Further, under stable conditions movable integrator member 44 is stable such that no fluid is flowing either into or out of compartment 52 and there is no flow through or pressure drop across velocity bleed 72, such that $P_y$ equals $P_X$ as illustrated by the $P_y$ curve 96 being coincident with $P_X$ curve 98. It will be noted that the net effect of $P_0$ pressure in compartment 54 and $P_R$ pressure in compartment 56 is to provide a substantially constant force urging integrator member 44 to the left. This net leftward urging force is opposed by $P_y$ in compartment 52 and under stable conditions these forces are in balance. Since the leftward urging force is constant it follows that $P_y$ has only one value where force balance exists and this value is dependent on the absolute value of $P_R$, $P_0$, and the area ratio of pressure responsive members 48 and 50. This balance value of $P_y$, and also $P_X$, may be termed "null" value and is represented by curves 96 and 98 between $T_0$ and $T_1$. Thus integrator member 44 has a stable position and maintains valve 74 in a stable position thus regulating $P_f$ and $F_f$ at stable values. $F_f$ curve 94 is offset downwardly from $F_i$ curve 88 due to the presence of balancing spring 40.

At time $T_1$ input force $F_i$ assumed to increase at a given rate as illustrated by the upward slope portion of curve 88. In the FIGURE 2 device, an increase in $F_i$ will upset the force balance on beam 24, rotate the beam counterclockwise in opposition to balance spring 40 and permit more fluid to flow from conduit 66, thus decreasing $P_X$ pressure. The decrease in $P_X$ pressure will be immediately conveyed to receiver bellows 84 as an output signal. The decrease in $P_X$ establishes a $P_y - P_X$ pressure drop across velocity bleed 72 so that fluid flows out of compartment 52 reducing $P_y$ slightly below its null value and causing integrator member 44 to move to the left. $P_y$ will deviate only slightly from its null value an amount sufficient to move integrator member 44, since the fluid in compartment 52 is always under compression of the forces generated by fluid pressures in compartments 54 and 56. The rate or velocity at which integrator 44 moves is dependent on how fast fluid flows from compartment 52 which in turn is controlled by the area of velocity restriction 72 and the $P_y - P_X$ pressure drop thereacross. Thus for a given external setting of velocity bleed 72, the velocity of integrator 44 is proportional to the departure between $P_X$ and $P_y$ pressures. Leftward movement of integrator member 44 is initiated at time $T_2$ at which time valve 74 is progressively moved to the left increasing $P_f$ and feedback force $F_f$. The rate of increase of $F_f$ represented by the upward slope of curve 94 will be substantially the same as the rate of increase of $F_i$ or slope of curve 88. It will be noted that an output signal $P_X$ is generated before movement of integrator member 44 is initiated and has in fact reached its peak change at time $T_2$.

At time $T_3$, $F_i$ is again stabilized and since $F_f$ is still increasing, beam 24 will be rotated clockwise back towards its null position decreasing $P_X$ as indicated by curve 98. When $P_X$ regains its null value, integrator member 44 will cease moving, and maintain $F_f$ at a stable balancing value as indicated after time $T_4$.

If then $F_i$ is decreased at a rapid rate as indicated by curve 88 after time $T_5$, beam 24 will rotate clockwise increasing $P_X$. Since the rate of $F_i$ decrease is greater than the rate of increase between times $T_1$ and $T_3$, beam 24 will be displaced a greater angular amount thus causing $P_X$ to deviate a greater degree from its null value and in the opposite direction as shown by curve 98. Thus a greater change in output signal is sensed by receiver bellows 84 and a greater $P_X - P_y$ pressure differential exists across velocity bleed 72, and fluid will flow into compartment 52 at a more rapid rate. Increased flow into compartment 52 will move integrator member 44 at an increased velocity to the right thus decreasing $P_f$ and $F_f$ at a more rapid rate as indicated by the steeper slope portion of curve 94 after time $T_6$. On stabilizing $F_i$, beam 24 will be restored to its null position as will $P_x$ and $P_y$.

It will be noted from curve 98 that $P_x$ deviates from its null value substantially proportional to the rate of change of $F_i$ and in a direction reflecting whether $F_i$ is increasing or decreasing. Also $P_x$ is almost immediately changed to reflect the rate change and is not retarded by the lag constant of integrator member 44 or any other movable servo device. This system is primarily useful for low displacement changes of bellows 84 so that the bellows volume changes will not adversely affect $P_x$ pressure. Further it has been found that degree of spiking of $P_x$ at times $T_4$ and $T_6$ may be controlled to any desirable degree by suitable selection of spring rate for balance spring 40. In the preferred arrangement or use of the present device a moderate degree of spiking is desirable to insure initial rapid movement of an output device.

Referring now to FIGURE 4 there is shown an arrangement of the present invention for generating either high or low displacement rate output signals. Parts corresponding to those of the FIGURE 2 embodiment bear identical numerals and in general this includes the entire rate generator with the exception of output receiver bellows 84 and connection. Separate output signal receiving means has been provided that does not utilize $P_x$ pressure and therefore does not affect the $P_x$ characteristic as plotted in FIGURE 3. A proportional acting or type O servo device 100 is provided which includes a stepped diameter housing 102 and a pressure responsive movable output member 104 contained in said housing. Output member 104 is comprised of a first large pressure responsive member or diaphragm 106 and a second smaller pressure responsive member or piston 108 centrally secured to a connecting output rod 110. Pressure responsive members 106 and 108 divide the interior of housing 102 in three compartments 112, 114 and 116 as illustrated. Compartment 112 receives $P_0$ fluid from comparer 12 through conduit 118. High pressure control fluid $P_R$ is supplied to intermediate compartment 114 by a conduit 120 which is connected to conduit 62 upstream of restriction 64. A compression spring member 122 is disposed in compartment 116 where it bears against the sidewall of housing 102 and pressure member 106 to apply a force to movable output member 104 proportional to its axial position within housing 102. Fluid pressure designated $P_z$ is supplied to compartment 116 through conduits 124, 126 and 128 from conduit 120. Conduit 128 includes a restriction 130 for inducing a pressure drop proportional to flow velocity therethrough in a manner similar to restriction 64. A branch conduit 132 connects conduit 128 downstream of restriction 130 to the interior of comparer housing 30 where said branch conduit terminates in an orifice 134 arranged in close proximity to beam 24 such that $P_z$ is controlled in a manner similar to $P_x$. Thus $P_z$ will generally follow or be proportional to the $P_x$ plot of curve 98 of FIGURE 3 and will displace output rod 110 an amount proportional to the deviation of $P_z$ from a null value. The advantage of this arrangement over the FIGURE 2 embodiment is that the fluid pressure displacing output member 104 ($P_z$) is separate from $P_x$ and thus the change in the volume of fluid in chamber 116 will not adversely affect $P_x$.

If desired additional parameters or signals may be readily combined by extending conduit 126 and providing a movable lever 136 for additionally controlling the velocity of flow through restriction 130 and thus the value of $P_z$. For example, it may be desired to supply a signal proportional to $F_i$ to lever 136 to obtain output displacement of rod 110 reflective of both the absolute change and the rate of change of $F_i$.

In FIGURE 5 there is shown a modified rate signal generator of the type shown in FIGURE 4 wherein the hydraulic circuit for generating $P_f$ feedback pressure is replaced by a mechanical arrangement for directly changing $F_f$. In this arrangement slab valve 74 is replaced with a lever pivot connection 140 on the right end of rod 46 of integrator member 44. Rod 46 is arranged to extend through the sidewall of housing 42. A lever 142 is supported by a fixed pivot support 144 and is connected on its upper end to the pivot connection 140 of rod 46. Another pivot connection 146 is provided on the lower end of lever 142 for connecting a link 148 having a roller 150 on its leftmost end. A compression spring 152 is fixed secured on one end and abuts against a retainer 154 on the other. Retainer 154 in turn bears against roller 150. Spring 152 generates feedback force $F_f$ which is applied to beam 24 and roller 150 is operative to vary the moment arm through which $F_f$ acts and thus the feedback moment on beam 24 in response to movement of integrator member 44.

In the FIGURES 2 and 4 arrangements the effect of $P_f$ pressure acting on the end of slab valve 74 produces a slight variation in the net force urging integrator member 44 to the left which may be undesirable for systems requiring a high degree of accuracy. One advantage of the mechanical connection of the FIGURE 5 embodiment would be to eliminate any $P_f$ induced variation although it is contemplated valve arrangements of a type insensitive to back pressure and well known in the art may also be used if desired.

Referring to FIGURE 6 there is shown an arrangement of a rate generator in accordance with the present invention for producing a rate of change output in response to a position or displacement input signal. In this arrangement comparer 12 is modified to include a floating or non-pivoted beam 160 which receives an input position or displacement quantity $D_i$ at the right end thereof applied by movable input rod member 162. An integrator device 18 in accordance with previous embodiments has its central connecting rod 46 directly connected by pivot 164 to the left end of floating beam 160 to supply a feedback displacement quantity $D_f$ to rod 160 in opposition to the movement of $D_i$. A pair of hemispherical servo valves 166 and 168 are formed on floating beam 160 in operative proximity to orifices 132 and 68 to control the velocity of flow through and pressure drop across orifices 130 and 64 respectively in a manner previously described and thus effect control of $P_z$ and $P_x$ pressures. In this arrangement an output signal receiver bellows 170 is directly connected to conduit 126 to receive $P_z$ pressure. In the arrangement shown in FIGURE 6 servo valves 166 and 168 are spaced along the longitudinal axis of floating beam 160 which is suitable in designs having a small angular range of movement of beam 160 or where an error deviation in $P_z$ pressure is permissible. However where greater accuracy is required an arrangement such as that illustrated in FIGURE 7 may be employed wherein servo valves 166 and 168 are secured to an intermediate bracket 172 and aligned on an axis transverse to the longitudinal axis of beam 160. This arrangement insures uniform spacing between servo valves 166 and 168 and their respective orifices 134 and 68 regardless of angular movement of beam 160. The operation of the FIGURES 6 and 7 species is substantially similar to the previous embodiments with the exception that the input and feedback quantities are position rather than force quantities and the balance beam is pivotless.

Having illustrated and described the preferred embodiments of the present invention, it will be apparent that various changes and modifications may be made or sub-

We claim:

1. A rate signal generator comprising: comparer means for receiving input and feedback force quantities and producing an error signal representative of the difference between said force quantities, an integrator device including a movable member having a controllable velocity, force producing means connected to said integrator for producing a force that varies with the position of said movable member, said force producing means being connected to said comparer to supply said feedback force quantity thereto, connecting means interconnecting said comparer and said integrator device operative to control the velocity of said movable member in response to variations of said error signal, and output signal receiving means connected to said connecting means for receiving said error signal as a rate output.

2. A rate signal generator comprising: a movable balance beam movable in response to input and feedback quantities, integrator means connected to said balance beam operative to control the rate of change of said feedback quantity in response to deviation of the position of said balance beam from a fixed reference, and output means additionally responsive to the deviation of said balance beam from a fixed reference for producing an output signal proportional to said deviation.

3. A rate signal generator comprising: a movable balance beam movable in response to input and feedback quantities, a type 1 hydraulic servo having a movable member, said hydraulic servo including a movable member fluidly connected to said balance beam having a velocity proportional to deviation of said balance beam from a fixed reference, feedback means connected to said hydraulic servo for controlling the magnitude of said feedback quantity in response to the position of said movable member, and output means fluidly connected to said balance beam for producing an output signal proportional to the deviation of said balance beam from a fixed reference.

4. A rate signal generator comprising: a movable balance beam movable in response to input and feedback quantities, fluid pressure means including a fixed servo orifice arranged in close proximity to said balance beam operative to control a control fluid pressure that varies directly with the position of said balance beam relative to said fixed orifice, a hydraulic servo having a movable member fluidly connected to said fluid pressure means, said movable member having a velocity proportional to the magnitude of said control fluid pressure, feedback means connected to said hydraulic servo for controlling the magnitude of said feedback quantity in response to the position of said movable member, and output means connected to said fluid pressure means for producing an output signal proportional to the magnitude of said control fluid pressure.

5. A rate signal generator comprising: a movable balance beam movable in response to input and feedback quantities, said beam having a position that varies from a fixed reference in proportion to the difference between said quantities, first and second fixed servo orifice members arranged in close proximity to said balance beam so that the effective flow controlling areas of said servo orifices is directly related to the position of said balance beam, control fluid pressure means fluidly connected to said first fixed servo orifice to generate a control fluid pressure that varies in magnitude with the effective area of said first servo orifice, output fluid pressure means fluidly connected to said second fixed servo orifice to generate an output fluid pressure that varies in magnitude with the effective area of said second servo orifice, a hydraulic servo device connected to said control fluid pressure means and having a movable member movable at a rate that varies directly with said control fluid pressure, feedback means connected to said hydraulic servo for controlling the magnitude of said feedback quantity, and an output signal receiver connected to said output fluid pressure means for receiving an output signal that varies directly with said output fluid pressure.

6. A rate signal generator comprising: a movable balance beam positionable in response to the difference between input and feedback quantities, pressure means operative to generate a variable control fluid pressure that varies with the deviation in position of said balance beam from a fixed reference, a hydraulic servo device having a movable pressure responsive member, means supplying a substantially constant pressure fluid to one side of said pressure responsive member to provide a substantially constant force urging said pressure responsive member in one direction, conduit means interconnecting said pressure means and said movable pressure responsive member to supply said variable control fluid pressure to an opposite side of said movable pressure responsive member to provide a variable force opposing said constant force, feedback means connected to said movable pressure responsive member for controlling the magnitude of said feedback quantity in response to the position of said pressure responsive member, and output means operative to produce an output signal that varies with the deviation in position of said balance beam from a fixed reference.

7. A rate signal generator as claimed in claim 6 wherein said output means includes separate means for generating an output fluid pressure that varies with the deviation of said balance beam.

8. A rate signal generator as claimed in claim 6 wherein said output means is connected to said pressure means to extract said variable fluid pressure as an output signal.

9. A rate signal generator as claimed in claim 6 wherein said input quantity is a force quantity and said balance beam is pivoted.

10. A rate signal generator as claimed in claim 6 wherein said input quantity is a position quantity and said balance beam is a floating member.

11. A rate signal generator as claimed in claim 6 including a velocity control bleed disposed in said conduit means for controlling the fluid flow velocity therein.

12. A rate signal generator comprising: a pivoted balance beam angularly positionable in response to the difference between input and feedback force quantities, a hydraulic servo having a member movable at a rate that varies with the deviation of said beam from a fixed reference, control fluid supply means operative to supply a substantially constant pressure control fluid, a pressure member operative to produce said feedback force quantity in response to the magnitude of fluid pressure acting on said pressure member, conduit means interconnecting said control fluid supply means and said pressure member to supply an actuating fluid pressure thereto, valve means disposed in said conduit means operative to vary the pressure of fluid acting on said pressure member in response to the position of said valve, said valve being connected to said movable member of said hydraulic servo for movement therewith, and output means operative to produce an output signal that varies with deviation of said balance beam from a fixed reference.

13. A rate signal generator comprising: a pivoted balance beam angularly positionable in response to the difference between input and feedback force moment quantities, a hydraulic servo having a member movable at a rate that varies directly with the deviation of said beam from a fixed reference, a spring member operative to generate the force component of said feedback force-moment quantity, a movable fulcrum member interposed between said spring member and said balance beam to vary the moment arm of said force-moment quantity, means interconnecting said movable fulcrum member and said movable member of said hydraulic servo so that said feedback force-moment quantity is varied with the position of said movable member, and output means operative to produce an output signal that varies with the deviation of said balance from a fixed reference.

14. A rate signal generator comprising: a floating beam member positionable in response to the difference between input and feedback position quantities, a hydraulic servo having a member movable at a rate that varies directly with the deviation of said beam from a fixed reference, means directly interconnecting said movable member and said beam member to supply said feedback position quantity thereto, and output means operative to produce an output signal that varies with the deviation of said beam from a fixed reference.

References Cited in the file of this patent
UNITED STATES PATENTS

| | | |
|---|---|---|
| 2,638,874 | Woodhull | May 19, 1953 |
| 2,755,812 | Garnett | July 24, 1956 |
| 2,966,141 | Corbett | Dec. 27, 1960 |
| 2,974,641 | Brown et al. | Mar. 14, 1961 |